United States Patent [19]

Austin et al.

[11] 3,995,742
[45] Dec. 7, 1976

[54] FISHING ROD SUPPORT

[76] Inventors: Milton Austin, 3 Spielman Road, Fairfield, N.J. 07006; Arthur G. Kendall, 37 Passaic Ave., Livingston, N.J. 07039

[22] Filed: Jan. 19, 1976

[21] Appl. No.: 650,442

Related U.S. Application Data

[63] Continuation-in-part of Ser. No. 558,961, March 17, 1975.

[52] U.S. Cl. .............................. 211/60 R; 211/64; 16/150
[51] Int. Cl.² .......................................... A47F 7/00
[58] Field of Search ............. 211/60 R, 62, 63, 64, 211/68, 57; 16/150

[56] References Cited
UNITED STATES PATENTS

| | | | |
|---|---|---|---|
| 1,066,555 | 7/1913 | Treiber | 211/68 |
| 3,507,398 | 4/1970 | Schaefer | 211/64 X |
| 3,524,572 | 8/1970 | Hall | 211/60 R X |
| 3,643,811 | 2/1972 | Howerton | 211/64 |
| 3,792,775 | 2/1974 | Riddle | 211/60 R |
| 3,848,786 | 11/1974 | Baxter | 211/60 R X |

FOREIGN PATENTS OR APPLICATIONS 2,013,133  9/1971  Germany .............................. 211/57

*Primary Examiner*—Roy D. Frazier
*Assistant Examiner*—Peter A. Aschenbrenner
*Attorney, Agent, or Firm*—Silverman and Jackson

[57] ABSTRACT

A fishing rod support which may be mounted on either a wall or a ceiling surface which comprises a pair of cooperating bracket members comprising a proximal bracket adapted to receive the handle portion of said rod, and a distal bracket provided with a generally U-shaped channel for receiving the tip portion of said rod, said channel having its longitudinal dimension in parallel relation to the plane of said wall or ceiling surface, and means for retaining said tip within said channel comprising a lip extending perpendicular to said longitudinal dimension, a pivotable gate attached at one end thereof to a peripheral edge of said channel, and a depression in the wall of said channel adjacent said lip adapted to retain said tip out of contact with said gate.

8 Claims, 5 Drawing Figures

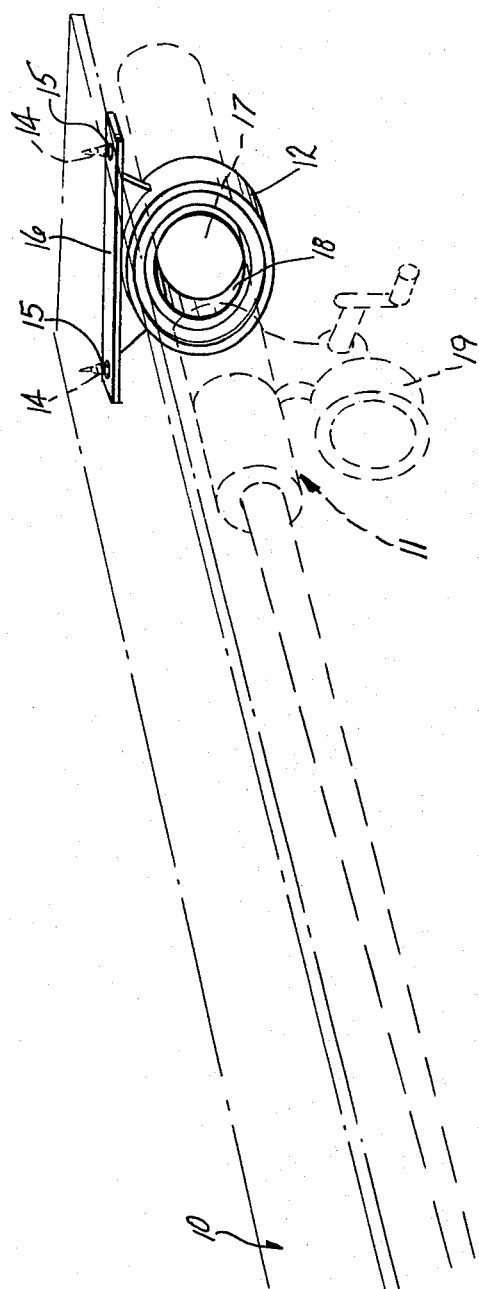
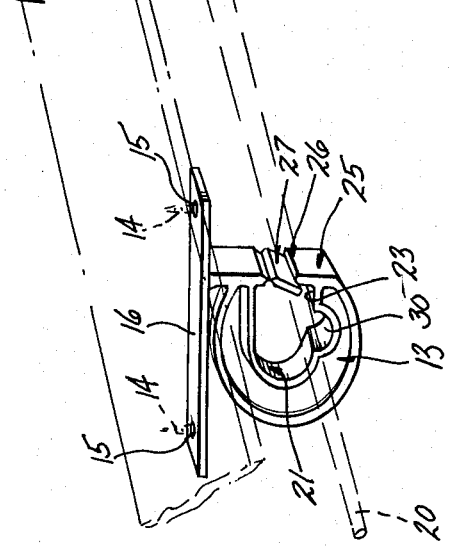
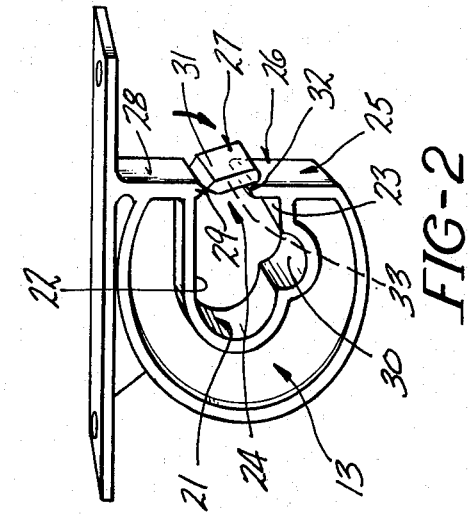
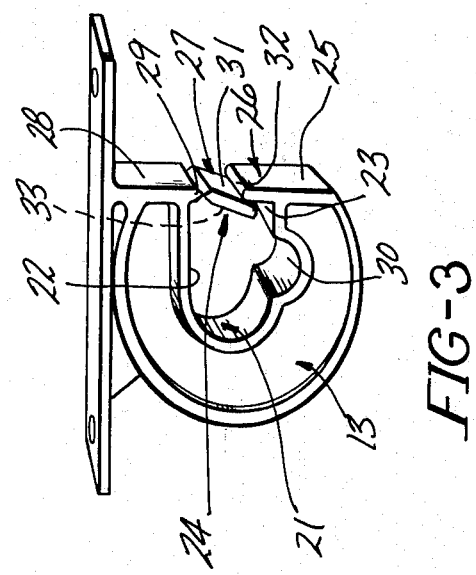

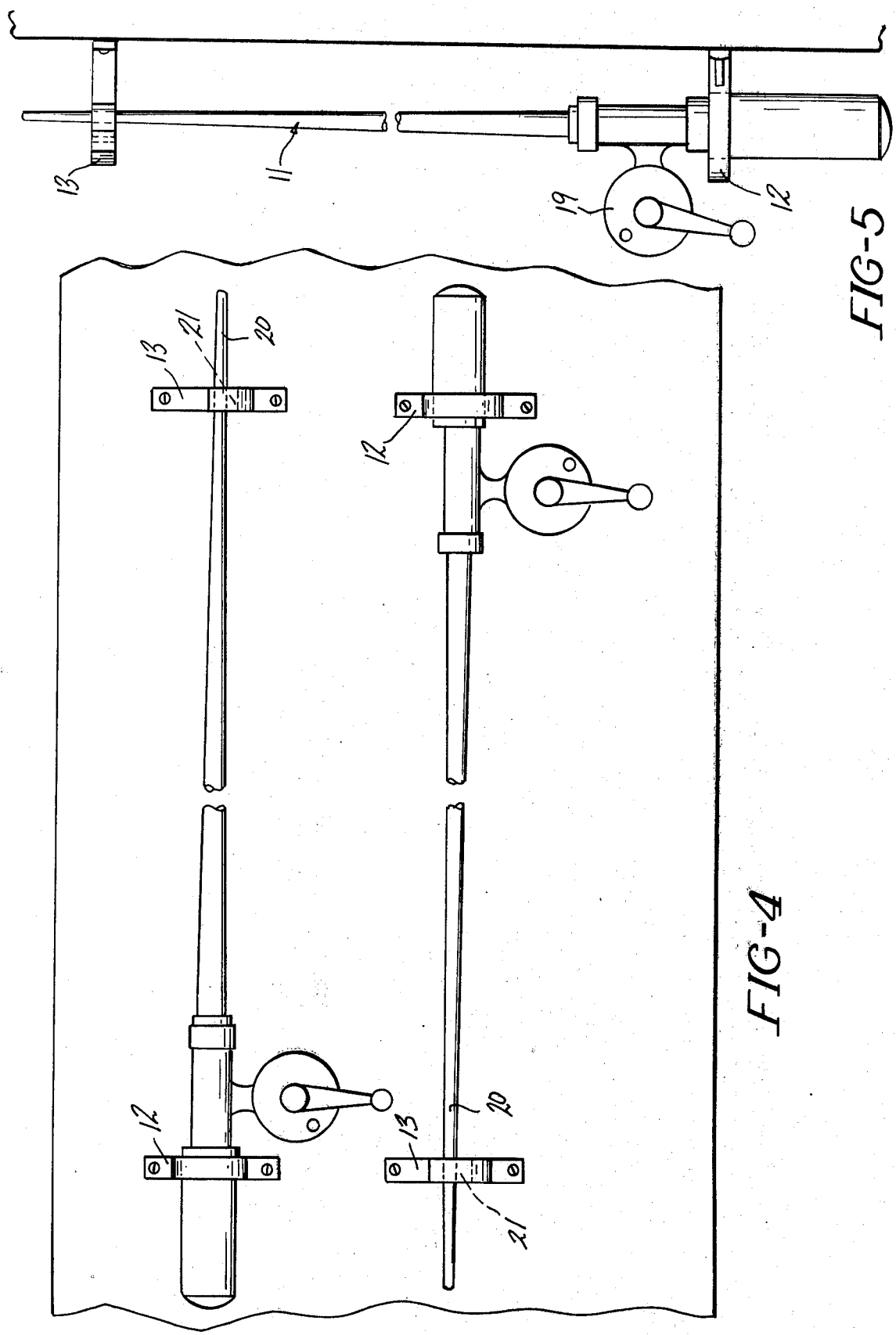

FISHING ROD SUPPORT

CROSS REFERENCE TO RELATED APPLICATION

The present application is a continuation-in-part of copending application Ser. No. 558,961, filed on Mar. 17, 1975, by the inventors herein.

BACKGROUND OF THE INVENTION

The invention generally relates to fishing rod support structures, and particularly to such structures as are useful to support the rod when not in use.

A wide variety of support structures are presently known which are useful for the support of fishing rods in storage on seagoing vessels such as deep sea fishing boats and the like. Such structures may comprise elaborate racks employing locking mechanisms having a multitude of moving parts, and are often fabricated from materials such as metals and woods which are more complex to manufacture and which require extensive treatment with protective materials to withstand the prolonged exposure to a saline atmosphere. Also, many of the known support structures, particularly those designed to provide overhead support, are unreliable with the result that the rods or poles often dislodge and drop when the boat is in motion.

In our above-referenced copending application, a novel fishing rod bracket is disclosed which is easily manufactured and which obviates the aforenoted difficulties. The present application provides yet another solution to the same problems.

SUMMARY OF THE INVENTION

In accordance with the present invention, a fishing rod support structure is disclosed which comprises a pair of bracket members mountable in the overhead position or on a wall surface, said brackets comprising a proximal bracket adapted for receiving the handle portion of the rod, and a distal bracket adapted for receiving the tip portion thereof. The distal bracket is characterized by the provision therein of a U-shaped channel having a longitudinal dimension in parallel relation to the plane of the surface to which the bracket is attached. The tip portion is prevented from escaping said channel by a means comprising a lip located at the mouth of said channel which extends thereinto, and a gate pivotally integral at one end thereof to a peripheral edge of said channel and adapted to pivot into said channel by engaging and riding over said lip to fully block said mouth and close off said channel. A rounded depression is provided in the wall of said channel adjacent said lip to permit said tip to drop out of contact with said gate, after it rides over said lip and enters said channel.

The lip on the distal bracket retains the tip of the fishing rod within the channel in the instance where the boat is in motion and the gate is inadvertently left unlocked.

The fishing rod support of the present invention comprises only two separate parts and is easily and inexpensively fabricated from a wide variety of suitable materials, including many organic thermoplastic resin materials.

Accordingly, it is a principal object of the present invention to provide a fishing rod support which may be employed on either a ceiling or a wall surface.

It is a further object of the present invention to provide a fishing rod support as aforesaid which is simply and inexpensively manufactured and installed, and comprises a minimum number of parts.

It is still a further object of the present invention to provide a fishing rod support as aforesaid which provides a secondary retaining means for the tip of the fishing rod operable in an overhead installation of said support.

Further objects and advantages will become apparent to those skilled in the art from the ensuing description which proceeds with reference to the accompanying figures.

DESCRIPTION OF THE DRAWINGS

FIG. 1 is a perspective view, partly in phantom, of an overhead installation of the fishing rod support of the invention.

FIG. 2 is a perspective view illustrating the distal bracket member with the gate open to receive the tip of a fishing rod.

FIG. 3 is a perspective view illustrating the distal bracket member with the gate in the closed position.

FIG. 4 is a fragmentary front view of the horizontal installation of the fishing rod support on a wall.

FIG. 5 is a fragmentary side view of the vertical installation of the fishing rod support on a wall.

DETAILED DESCRIPTION

Referring to the drawings in detail wherein like numerals indicate like parts and initially to FIG. 1, the fishing rod support in accordance with the invention is illustrated as installed in an overhead position on a roof or ceiling 10 which may be located in a boat such as a cabin cruiser, though limitation thereto is not intended. The fishing rod 11, shown in phantom, is suspended between bracket members 12 and 13. Bracket members 12 and 13 are adapted for securement to ceiling 10 with conventional fastening means, such as screws 14 or the like, by openings 15 provided in planar base members 16.

Bracket member 12 comprises a proximal bracket which receives the handle portion 17 of fishing rod 11 within circular opening 18 located therein. Rod 11 is prevented from sliding backwards through opening 18 by reel 19, generally located in the position illustrated in FIG. 1. Bracket member 12 is of one-piece construction and may be easily manufactured in a variety of ways, discussed in greater detail hereinafter.

Bracket member 13 comprises a distal bracket similar in general configuration to bracket member 12, which is adapted to receive the tip portion 20 of rod 11 by the provision therein of a U-shaped channel 21. Channel 21 is situated within the body of bracket member 13 such that its longitudinal dimension defined by proximal wall 22 and distal wall 23 is located in a plane containing base member 16. This configuration is particularly advantageous when the support is employed in the overhead position, as the tip 20 is permitted to rest therein unaided, while the user may fully secure the rod in the manner described later.

Channel 21 opens at mouth 24 to receive tip portion 20. Mouth 24 is defined by the outer peripheral surface of bracket 13 comprising a first peripheral edge 25 located at the lower end of the mouth opening. Peripheral edge 25 is extended upward and in a vertical direction as depicted in FIGS. 1–3, in perpendicular relation to the longitudinal dimension of channel 21, to form lip 26, which partially obstructs the opening of mouth 24. Lip 26 comprises a further feature of the invention as it serves in conjunction with a depression in distal wall 23, described later, to restrain tip portion 20 from sliding out of channel 21 in the event that bracket 13 is unlocked and the surface and structure to which it is attached is in motion. Thus, in high seas or the like, lip 26 will effectively prevent escape of the fishing rod.

The means for retaining the tip portion 20 of fishing rod 11 securely within bracket 13 further comprises a flexible, resilient gate 27 comprising a rectangular planar structure adapted to pivot into position to flex and thus ride over lip 26 whereby it fully obstructs mouth 24 and thereby prevent the escape of the tip. Thus, for example, in FIG. 1, gate 27 is shown in the closed position, and tip 20 is securely held within channel 21. The foregoing features and their method of operation will be described in greater detail with reference to FIGS. 2 and 3.

Referring now to FIG. 2, comprising a perspective view of bracket 13, gate 27 is seen to comprise a planar bar-shaped structure integral with a second peripheral edge 28 located above mouth 24, through a reduced-thickness connecting portion 29, about which gate 27 is free to pivot into and out of locking position. Connecting portion 29, as well as gate 27 are of sufficient resiliency and tensile strength that they are not damaged or otherwise rendered unserviceable by repeated flexing. Naturally, as will be described later, these elements may be constructed of the appropriate materials to enable them to serve in this capacity. Gate 27 is adapted to pivot in the plane containing the longitudinal dimension of channel 21, in distinction to our parent application Ser. No. 558,961, wherein the gate therein travels at a right angle thereto. This is significant as gate 27 is in such position that mouth 24 is always somewhat obstructed. Further, locking of bracket 13, illustrated in FIGS. 1 and 3, involves only the location of gate 27 within channel 21 and against lip 26.

In this connection, the distal bracket of the present invention possesses an additional feature which facilitates the operation of the locking means and thereby comprises a part thereof. Referring again to FIGS. 1–3, a rounded depression 30 is provided in distal wall 23 relatively adjacent lip 26. Though illustrated as semicircular in shape, it is considered within the scope of the invention that depression 30 may be of any conventional shape, including rectangular or notched. The only requirement is that depression 30 be of sufficient size to accept in large measure the tip portion 20 or rod 11. As described hereinbelow, depression 30 accepts tip 20 and thereby permits tip 20 to break contact with gate 27 and drop out of its path of movement. Also, depression 30 serves the alternate function outlined with respect to lip 26, in that it cradles tip 20 and further, in the instance where bracket 13 is in an overhead installation, prevents its escape should gate 27 for some reason become disengaged.

The entire mechanism as above-described, constitutes the novel locking means of the invention. As can be seen, the locking means is elementary in design and manufacture and involves only one moving part, while providing a positive securement of the fishing rod tip portion 20 within distal bracket 13.

The operation of the above locking means is sequentially illustrated in FIGS. 2 and 3, respectively. In FIG. 2, gate 27 is in the open position and mouth 22 leading to channel 21 is free for the insertion of a fishing rod tip portion, not shown. The insertion of a fishing rod into bracket 13 is accomplished by the placement of tip portion, not shown, against the outer face 31 of gate 27. The tip portion is then pressed against face 31, whereby gate 27 flexes and rides over leading edge 32 of lip 26. Pressure is continued until gate 27 clears edge 32, at which point the tip will drop out of contact with face 31 and into depression 30, thereby enabling gate 27 to return to contact with lip 26 as illustrated in FIGS. 1 and 3. Removal of the fishing rod is accomplished merely by lifting tip 20 out of depression 30 and placing it against the inner face 33, labeled in phantom, of gate 27. Tip 20 is then pulled out of channel 21, whereby gate 27 flexes in the opposite direction to ride over leading edge 32, and gate 27 returns to the position shown in FIG. 2.

As noted earlier, the fishing rod support of this invention is of simple design and may be manufactured in a wide variety of ways. Thus, conventional materials, such as metals and certain woods may be employed in part and the individual brackets machined to final shape, by techniques such as turning on lathes, and the like or rolling, casting and stamping operations. In the instance where rigid materials are employed, the gate and connecting portion may be prepared from a flexible material and then appropriately attached to peripheral edge 28. In accordance with a preferred embodiment of the present invention, the support may also be prepared from a wide variety of resilient organic polymeric materials including both thermoplastic and thermosetting resins. Representative of such materials are thermoplastic materials such as polyesters, including the acetates, acrylates and methacrylates, polyamides, polycarbonates and various suitable polyofefins, and thermosetting materials such as phenol-formaldehyde and urethane resins and the like. These materials may be molded by various suitable conventional techniques such as extrusion, casting, hot stamping of pre-formed stock and injection molding. Preferably, the brackets are prepared from thermoplastic polymeric materials which are favorably processed by injection molding. The support is merely molded into two separate parts comprising brackets 12 and 13, and gate 27 and connecting portion 29 are so dimensioned that they will possess the desired flexibility and resilience.

As stated earlier, the support is capable of installation in a variety of positions on both ceiling and wall structures. Referring back to FIG. 1, an overhead installation is depicted, which is likely to be the most common manner employed in seagoing vessels and the like. FIGS. 4 and 5 schematically illustrate the installation of the support on a wall structure. In FIG. 4, two fishing rods are shown mounted in reversed end-for-end relationship in the horizontal position, by two sets of brackets 12 and 13. In both installations, bracket 13 is mounted so that channel 21 opens in the upward position, and can thereby cradle tip portion 20 without the engagement of gate 27.

FIG. 5 depicts a vertical wall installation of a fishing rod with the support of the invention. For this installation, the rod must be restrained from sliding vertically downward and out of the support. To this end, the installation should either be made in close proximity to the floor or the deck, or the rod should be stored with the reel 19 mounted thereon.

The support may be prepared in a variety of aesthetically pleasing configurations, colors and textures within the scope of the invention and may, thus, be prepared in a multitude of fast colors and in textures such as wood grain, in the instance where organic polymeric resins are employed as starting stock.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. A fishing rod support comprising a pair of cooperating bracket members adapted for attachment to either a horizontal or a vertical surface to support said fishing rod, said bracket members comprising:
    a proximal bracket member adapted to receive the handle portion of said rod;
    a distal bracket member possessing a U-shaped channel, said channel comprising parallel proximal and distal walls defining the longitudinal dimension thereof and adapted to receive the tip portion of said rod, said longitudinal dimension lying in a plane parallel to the plane of said surface, and said channel possessing a mouth defined by a first and a second peripheral edge of said distal bracket member; and
    means associated with said channel for retaining said tip portion securely therein comprising a lip extending into said mouth from said first peripheral edge in a plane perpendicular to said longitudinal dimension to partially obstruct said mouth, a flexible, resilient gate located in a plane parallel with the plane of said lip, said gate integral at one end thereof with said second peripheral edge, and adapted for pivotable reciprocation within the plane containing said longitudinal dimension, and flexure whereby it may engage and ride over said lip, and a rounded depression provided in said distal wall adjacent said first peripheral edge to said tip portion to drop out of engagement with said gate after it rides over said lip and enters said channel whereby said gate may pivot into contact with an inner surface of said lip.

2. The support of claim 1 wherein said flexible gate is integral with said second peripheral edge by the provision therebetween of a reduced-thickness connecting portion.

3. The support of claim 2 wherein said distal bracket further includes means for locking said gate in position in obstruction of said mouth.

4. The support of claim 3 wherein said locking means comprises said lip, and said gate is locked upon contact therewith.

5. The support of claim 1 wherein said bracket members are prepared from metal.

6. The support of claim 1 wherein said bracket members are prepared from wood materials.

7. The support of claim 1 wherein said bracket members are prepared from organic polymeric material.

8. The support of claim 7 wherein said organic polymeric material comprises thermoplastic resins which are fabricated by injection molding.

* * * * *